(12) United States Patent
Hirao

(10) Patent No.: US 6,587,139 B1
(45) Date of Patent: Jul. 1, 2003

(54) DEVICE FOR MEASURING PERIOD OF SYNCHRONIZING SIGNAL AND DISPLAY DEVICE

(75) Inventor: Yoshichika Hirao, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 383 days.

(21) Appl. No.: 09/707,934

(22) Filed: Nov. 8, 2000

(30) Foreign Application Priority Data

Nov. 11, 1999 (JP) .............................. 11-321077

(51) Int. Cl.[7] .................... H04N 17/02; H04N 5/04
(52) U.S. Cl. ................. 348/194; 348/500; 348/536; 348/691
(58) Field of Search ................ 348/194, 180, 348/500, 524, 536, 540, 547, 691, 695; H04N 17/02, 5/04

(56) References Cited

U.S. PATENT DOCUMENTS

| | | | |
|---|---|---|---|
| 4,794,626 A | * 12/1988 | Tanabe et al. | ............. 348/500 |
| 4,860,100 A | 8/1989 | Rakhodai et al. | |
| 5,341,218 A | 8/1994 | Kaneko et al. | |
| 5,382,922 A | 1/1995 | Gersbach et al. | |
| 5,754,250 A | 5/1998 | Cooper | |

FOREIGN PATENT DOCUMENTS

EP     0807923 A1     6/1997

OTHER PUBLICATIONS

Patent Abstracts of Japan; vol. 018, No. 329 (E–1566), Jun. 22, 1994 (Jun. 6, 1994) & JP 06 078173 A (ROHM CO LTD), Mar. 18, 1994, Abstract.

* cited by examiner

*Primary Examiner*—Sherrie Hsia
(74) *Attorney, Agent, or Firm*—Armstrong, Westerman & Hattori, LLP

(57) ABSTRACT

Disclosed is a period measuring device comprising a clamping circuit to which a synchronizing signal in an input image signal is inputted, a comparator for removing noise in the synchronizing signal outputted from the clamping circuit, period measuring circuit for measuring the period of the synchronizing signal on the basis of the synchronizing signal obtained by the comparator, judging circuit for judging whether or not the period of the synchronizing signal which has been measured by the period measuring circuit is stable, and a control circuit for controlling, when the judging circuit judges that the period of the synchronizing signal is not stable, a threshold voltage of the comparator such that the period of the synchronizing signal is stabilized.

4 Claims, 5 Drawing Sheets

DEVICE FOR MEASURING PERIOD OF SYNCHRONIZING SIGNAL AND DISPLAY DEVICE

BACKGROUND OF THE INVENTION

1. Field of the Invention

The present invention relates to a device for measuring the period of a synchronizing signal in an input image signal, in a display device required to reflect a computer image, for example, which is suitable for a case where one of dots composing dot data of the input image signal and one pixel in the display device must be synchronized with each other on the basis of the period of the synchronizing signal, and a display device comprising the period measuring device.

2. Description of the Prior Art

A graphic signal produced by a computer is produced in a digital manner in units of dots (pixels) using a reference clock in the computer. However, the horizontal and vertical frequencies of the outputted image signal greatly differ depending on the maker of the computer and or the resolution of the image signal.

In a liquid crystal projector, for example, which is equipment for outputting a computer image, digital processing must be performed in complete synchronization with the dots (pixels) composing an inputted image signal. Therefore, the liquid crystal projector previously stores, for each of the frequencies of synchronizing signals in various types of image signals, data such as horizontal resolution, vertical resolution, the total number of dots in the horizontal direction, and the total number of lines in the vertical direction which are suitable for the image signal as a table.

The frequency of the synchronizing signal inputted simultaneously with the input image signal is measured, the data such as horizontal resolution, vertical resolution, the total number of dots in the horizontal direction, and the total number of lines in the vertical direction which correspond to the image signal whose frequency almost coincides with the frequency are read out of the table, and one of dots composing dot data of the input image signal and one pixel in a liquid crystal panel are synchronized with each other on the basis of the data read out, to perform digital processing such as scan conversion or filtering. Consequently, the frequency of the synchronizing signal inputted simultaneously with the input image signal must be accurately measured.

FIG. 6 illustrates the circuit configuration of a conventional synchronizing signal input section.

The conventional synchronizing signal input section is constituted by an RC filter 1 for noise reduction and a logic circuit 2 with a Schmidt trigger function. The characteristics of a cable for inputting an image signal and a synchronizing signal which are outputted form a computer into a projector cause ringing to occur in an edge of the synchronizing signal, as shown in FIG. 5.

An attempt to remove such ringing by the RC filter 1 makes it necessary to reduce the cut-off frequency of the RC filter. If the cut-off frequency of the RC filter is made too low, however, the synchronizing signal becomes dull, thereby delaying the synchronizing signal from the image signal as well as adversely affecting a synchronizing circuit in the succeeding stage.

The logic circuit 2 with a Schmidt trigger function greatly differs in the way of superimposition of noise by the characteristics of an input stage. This logic circuit 2 is effective for noise having a small amplitude when it is composed of a CMOS (Complementary Metal-Oxide Semiconductor), for example, while being unfavorable for a case where the amplitude of the synchronizing signal itself fed from the computer is small.

When the logic circuit 2 is composed of a TTL (Transistor-Transistor Logic), the logic circuit 2 is favorable for a case where the amplitude of the synchronizing signal itself is small and noise from the high potential side, while being unfavorable for noise having a small amplitude.

In the conventional synchronizing signal input section, measures to prevent noise in the synchronizing signal are thus insufficient. Accordingly, the frequency of the synchronizing signal cannot be accurately measured.

SUMMARY OF THE INVENTION

An object of the present invention is to provide a device for measuring the period of a synchronizing signal so adapted that the period of the synchronizing signal can be accurately measured even when ringing and noise are superimposed on the synchronizing signal, and a display device comprising the period measuring device.

A first period measuring device for measuring the period of a synchronizing signal in an input image signal according to the present invention is characterized by comprising a clamping circuit to which the synchronizing signal in the input image signal is inputted; a comparator for removing noise in the synchronizing signal outputted from the clamping circuit; period measuring means for measuring the period of the synchronizing signal on the basis of the synchronizing signal obtained by the comparator; judging means for judging whether or not the period of the synchronizing signal which has been measured by the period measuring means is stable; and means for controlling, when the judging means judges that the period of the synchronizing signal is not stable, a threshold voltage of the comparator such that the period of the synchronizing signal is stabilized.

A second period measuring device for measuring the period of a synchronizing signal in an input image signal according to the present invention is characterized by comprising a clamping circuit to which the synchronizing signal in the input image signal is inputted; a comparator for removing noise in the synchronizing signal outputted from the clamping circuit; a period measuring circuit for measuring the period of the synchronizing signal on the basis of the synchronizing signal obtained by the comparator; a judging circuit for judging whether or not the period of the synchronizing signal which has been measured by the period measuring circuit is stable; and a control circuit for controlling, when the judging means judges that the period of the synchronizing signal is not stable, a threshold voltage of the comparator such that the period of the synchronizing signal is stabilized.

A first display device according to the present invention is a display device comprising a period measuring device for measuring the period of a synchronizing signal in an input image signal, charaterized in that the period measuring device comprises a clamping circuit to which the synchronizing signal in the input image signal is inputted, a comparator for removing noise in the synchronizing signal outputted from the clamping circuit, period measuring means for measuring the period of the synchronizing signal on the basis of the synchronizing signal obtained by the comparator, judging means for judging whether or not the period of the sychronizing signal which has been measured by the period measuring means is stable, and means for controlling, when the judging means judges that the period of the synchronizing signal is not stable, a threshold voltage of the comparator such that the period of the sychronizing signal is stabilized.

A second display device according to the present invention is a display device comprising a period measuring device for measuring the period of a synchronizing signal in an input image signal, characterized in that the period measuring device comprises a clamping circuit to which the synchronizing signal in the input image signal is inputted, a comparator for removing noise in the synchronizing signal outputted from the clamping circuit, a period measuring circuit for measuring the period of the synchronizing signal on the basis of the synchronizing signal obtained by the comparator, a judging circuit for judging whether or not the period of the synchronizing signal which has been measured by the period measuring means is stable, and a control circuit for controlling, when the judging means judges that the period of the synchronizing signal is not stable, a threshold voltage of the comparator such that the period of the synchronizing signal is stabilized.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Referring now to FIGS. 1 to 5 an embodiment of the present invention will be described.

Figure 1:
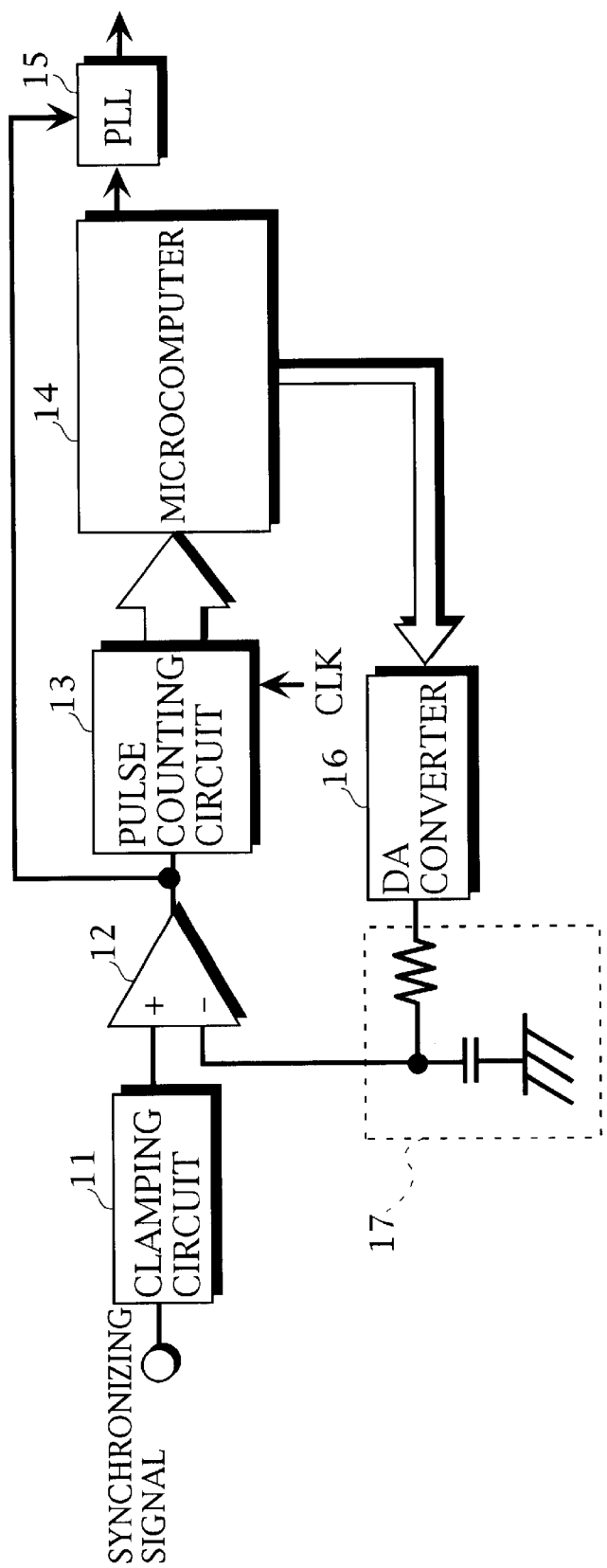
FIG. 1 is a circuit diagram showing a circuit for measuring the period of a synchronizing signal in an image signal inputted to a liquid crystal projector.

FIG. 1 illustrates a circuit for measuring the period of a synchronizing signal in an image signal inputted to a liquid crystal projector.

The synchronizing signal in the image signal fed from a computer is fed to a comparator 12 for removing noise through a clamping circuit 11. The synchronizing signal outputted from the comparator 12 is fed to a pulse counting circuit 13.

Figure 2:
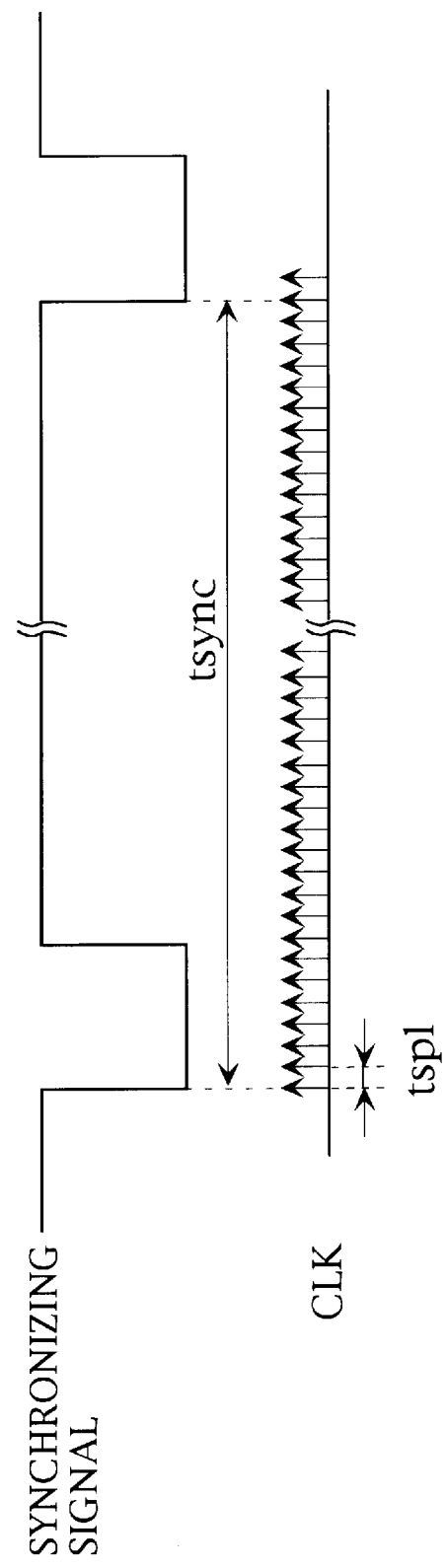
FIG. 2 is a timing chart showing the relationship between a synchronizing signal and a count clock in a case where there is no noise.

The pulse counting circuit 13 measures the period of the synchronizing signal, as shown in FIG. 2, on the basis of the synchronizing signal outputted from the comparator 12. Specifically, the pulse counting circuit 13 counts a time period from the fall of the synchronizing signal to the subsequent fall thereof or a time period from the rise of the synchronizing signal to the subsequent rise thereof using a fixed oscillation clock CLK with crystal precision, and its count value is stored in a buffer in the pulse counting circuit 13.

A microcomputer 14 reads data stored in the buffer in the pulse counting circuit 13 in a predetermined period. Letting tsync be the period of the synchronizing signal, tsp1 be the period of the clock CLK, and CA be the count value, for example, as shown in FIG. 2, CA is expressed by the following equation (1):

$$CA \approx tsync/tsp1 \quad (1)$$

Specifically, the count value CA is a value corresponding to the period tsync of the synchronizing signal. The microcomputer 14 judges the degree of stability of the count value CA read from the buffer (the degree of stability of the period of the synchronizing signal). If the synchronizing signal is normally a synchronizing signal having no noise, as shown in FIG. 2, the count value CA is always stabilized, and its error falls within ±1 clock. The microcomputer 14 judges that the count value CA is stable if it is in an allowable range for a predetermined time period, to determine the count value CA. The period CA of the synchronizing signal in the input image signal, that is, a frequency divided value for generating a sampling clock suitable for the type of the input image signal is outputted to a PLL (Phase-Locked Loop) 15 for generating a clock for sampling the input image signal from the synchronizing signal.

For each period of the synchronizing signal in the image signal, a frequency divided value suitable therefor is stored in the microcomputer 14. The microcomputer 14 reads out, when the period of the synchronizing signal is stable, a frequency divided value corresponding to the period, and outputs the frequency divided value to the PLL 15. Consequently, the PLL 15 generates a sampling clock suitable for the type of the input image signal from the synchronizing signal.

Figure 3:
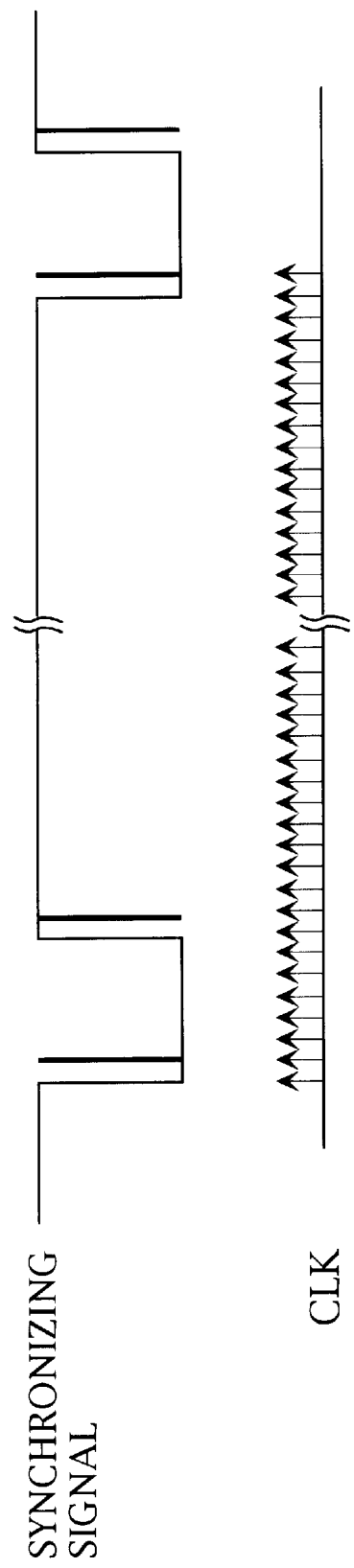
FIG. 3 is a timing chart showing the relationship between a synchronizing signal and a count clock in a case where there is noise.

When an unnecessary component other than the synchronizing signal is multiplexed on the synchronizing signal at random, as shown in FIG. 3, from the above-mentioned reason, however, the period of the synchronizing signal becomes unstable because the rise or the fall based on the unnecessary component other than the synchronizing signal occurs in a signal outputted from the comparator 12. In this case, the microcomputer 14 judges that the period CA of the synchronizing signal is unstable because its count value does not fall within an allowable range.

Figure 5:
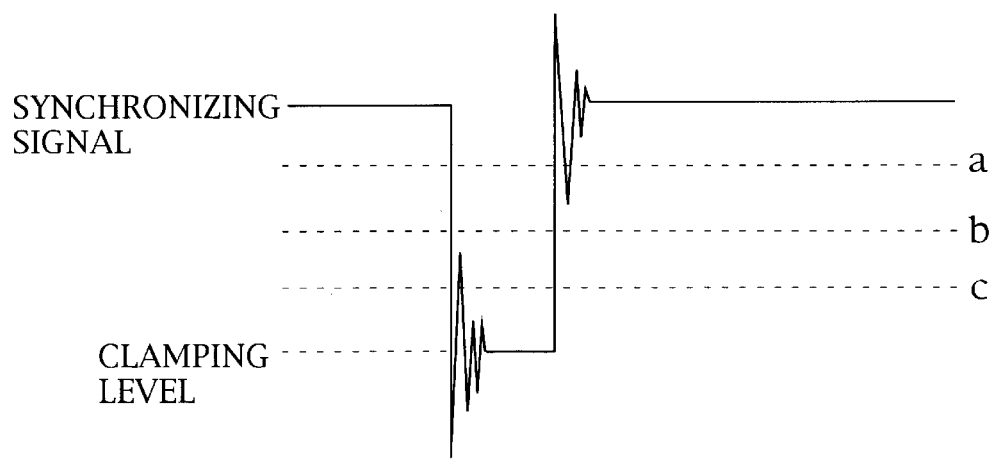
FIG. 5 is a schematic view showing the relationship between a synchronizing signal which rings and a threshold voltage (reference voltage) of a comparator 12.
Figure 6:
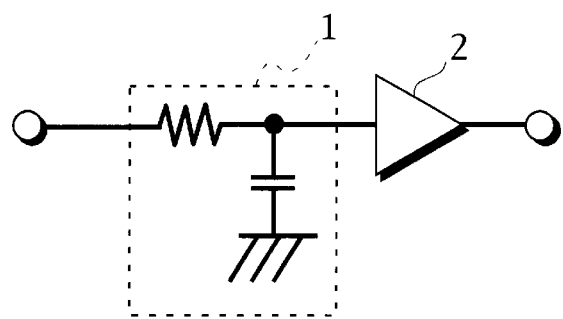
FIG. 6 is a circuit diagram showing the circuit configuration of a conventional synchronizing signal input section.

The microcomputer 14 sends out data to a DA converter 16 when it judges that the period CA of the synchronizing signal is unstable, to change an output voltage of the DA converter 16. An output of the DA converter 16 is smoothed by a smoothing circuit 17, to be a reference voltage (threshold voltage) of the comparator 12. The reference voltage of the comparator 12 is changed, so that the threshold of the synchronizing signal is changed to a, b, and c, as shown in FIG. 5. Accordingly, an unnecessary component (noise) included in the synchronizing signal outputted from the comparator 12 is changed.

In the pulse counting circuit 13, the period of the synchronizing signal is measured again, and the results of the measurement (the count value CA) are sent to the microcomputer 14. In the microcomputer 14, it is judged whether or not the period of the synchronizing signal is stable. When it is judged again that the period of the synchronizing signal is unstable, the reference voltage of the comparator 12 is similarly changed through the DA converter 16. This operation is repeated, to sweep the reference voltage of the comparator 12 at which the period of the synchronizing signal is stabilized.

Figure 4:
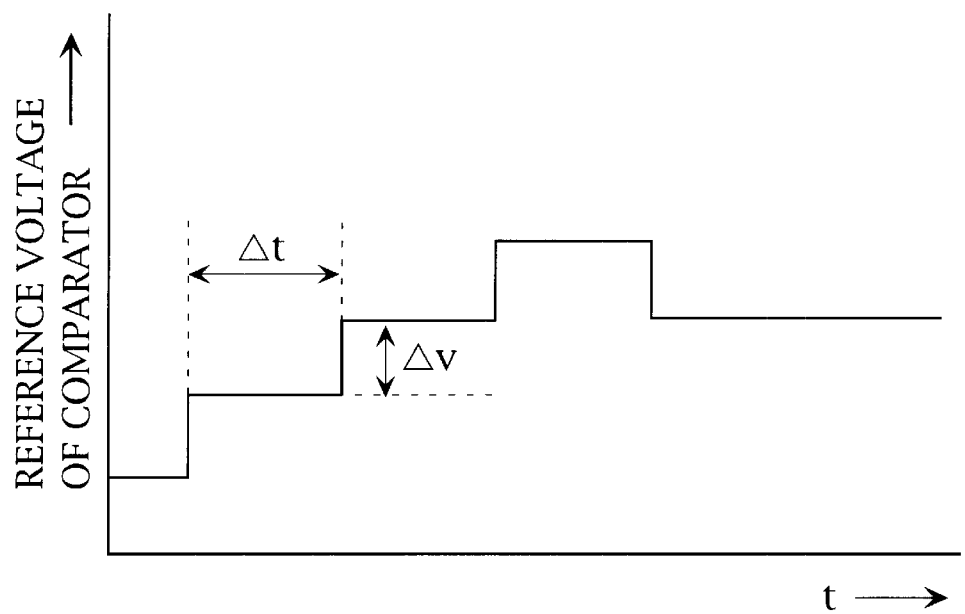
FIG. 4 is a timing chart showing how a reference voltage of a comparator 12 is controlled.

FIG. 4 shows how the reference voltage of the comparator 12 is controlled. In FIG. 4, Δt represents a period during which it is judged whether or not the period of the synchronizing signal is stable, and $\Delta v$ represents an amount of change in the reference voltage which is changed per operation.

The present invention is also applicable to a display device other than the liquid crystal projector.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A period measuring device for measuring the period of a synchronizing signal in an input image signal, comprising:
    a clamping circuit to which the synchronizing signal in the input image signal is inputted;
    a comparator for removing noise in the synchronizing signal outputted from the clamping
    period measuring means for measuring the period of the synchronizing signal on the basis of the synchronizing signal obtained by the comparator;
    judging means for judging whether or not the period of the synchronizing signal which has been measured by the period measuring means is stable; and
    means for controlling, when the judging means judges that the period of the synchronizing signal is not stable, a threshold voltage of the comparator such that the period of the synchronizing signal is stabilized.

2. A period measuring device for measuring the period of a synchronizing signal in an input image signal, comprising:
    a clamping circuit to which the synchronizing signal in the input image signal is inputted;
    a comparator for removing noise in the synchronizing signal outputted from the clamping circuit;
    a period measuring circuit for measuring the period of the synchronizing signal on the basis of the synchronizing signal obtained by the comparator;
    a judging circuit for judging whether or not the period of the synchronizing signal which has been measured by the period measuring circuit is stable; and
    a control circuit for controlling, when the judging means judges that the period of the synchronizing signal is not stable, a threshold voltage of the comparator such that the period of the synchronizing signal is stabilized.

3. A display device comprising a period measuring device for measuring the period of a synchronizing signal in an input image signal, wherein
    the period measuring device comprises
        a clamping circuit to which the synchronizing signal in the input image signal is inputted,
        a comparator for removing noise in the synchronizing signal outputted from the clamping circuit,
        period measuring means for measuring the period of the synchronizing signal on the basis of the synchronizing signal obtained by the comparator,
        judging means for judging whether or not the period of the synchronizing signal which has been measured by the period measuring means is stable, and
        means for controlling, when the judging means judges that the period of the synchronizing signal is not stable, a threshold voltage of the comparator such that the period of the synchronizing signal is stabilized.

4. A display device comprising a period measuring device for measuring the period of a synchronizing signal in an input image signal, wherein
    the period measuring device comprises
        a clamping circuit to which the synchronizing signal in the input image signal is inputted,
        a comparator for removing noise in the synchronizing signal outputted from the clamping circuit,
        a period measuring circuit for measuring the period of the synchronizing signal on the basis of the synchronizing signal obtained by the comparator,
        a judging circuit for judging whether or not the period of the synchronizing signal which has been measured by the period measuring means is stable, and
        a control circuit for controlling, when the judging means judges that the period of the synchronizing signal is not stable, a threshold voltage of the comparator such that the period of the synchronizing signal is stabilized.

* * * * *